United States Patent [19]
Moon

[11] Patent Number: 5,940,069
[45] Date of Patent: Aug. 17, 1999

[54] DRIVING SIGNAL GENERATOR FOR A LIQUID CRYSTAL DISPLAY

[75] Inventor: Seung-Hwan Moon, Seoul, Rep. of Korea

[73] Assignee: Samsung Electronics Co., Ltd., Suwon, Rep. of Korea

[21] Appl. No.: 08/914,757

[22] Filed: Aug. 20, 1997

[30] Foreign Application Priority Data

Aug. 21, 1996 [KR] Rep. of Korea ........................ 96-34608

[51] Int. Cl.⁶ ............................................... G09G 5/00
[52] U.S. Cl. ........................ 345/211; 345/212; 345/205; 345/87; 307/125; 307/130; 307/140; 307/139; 395/750.03; 395/750.05; 395/750.08
[58] Field of Search .................................. 345/211, 205, 345/212; 307/80, 85, 86, 87, 125, 130, 139, 140; 395/750.01–750.08

[56] References Cited

U.S. PATENT DOCUMENTS

| | | | |
|---|---|---|---|
| 5,283,762 | 2/1994 | Fujishima | 365/189.09 |
| 5,422,523 | 6/1995 | Roberts et al. | 326/68 |
| 5,550,729 | 8/1996 | Wissell | 363/65 |
| 5,608,275 | 3/1997 | Khosrowpour | 307/130 |
| 5,627,413 | 5/1997 | Mughir et al. | 307/86 |
| 5,632,039 | 5/1997 | Walker et al. | 395/750 |
| 5,680,068 | 10/1997 | Ochi et al. | 327/333 |
| 5,828,892 | 10/1998 | Mizuta | 395/750.01 |

*Primary Examiner*—Dennis-Doon Chow
*Assistant Examiner*—Amr Awad
*Attorney, Agent, or Firm*—Jones Volentine, L.L.P.

[57] ABSTRACT

A driving signal generator of the LCD includes a DC/DC converter which generates a constant analog voltage of 5V after receiving a power voltage of 5V or 3.3V. Resistors connected in series between the output terminal of the DC/DC converter and the ground divide the output voltage of the DC/DC converter. An npn-type transistor sets a digital voltage of 3.3V level from the voltage divided by the resistors, and an NMOS transistor outputs the digital voltage set by the npn-type transistor.

7 Claims, 2 Drawing Sheets

DRIVING SIGNAL GENERATOR FOR A LIQUID CRYSTAL DISPLAY

BACKGROUND OF THE INVENTION

This invention relates generally to a liquid crystal display. More particularly, the present invention relates to a driving signal generator for a liquid crystal display.

Generally, a twisted nematic mode liquid crystal display (LCD), which uses thin film transistors (TFTs) as switching elements, is supplied with an analog voltage of 5V as a liquid crystal driving voltage.

Recently, however, as the resolution of TFT LCDs has increased, the number of pixels in a display has similarly increased. This brings rise to the problem of electromagnetic interference (EMI) occurring in high resolution LCDs. In particular, EMI occurs in these high resolution LCDs in a digital circuit section such as a drive integrated circuit, since the relatively high voltages are used to drive the digital circuit.

Accordingly, to overcome this problem in high resolution TFT LCD modules, a lower voltage (about 3.3V) has been used to drive the digital circuit section. As a result, this means that the TFT LCD required both an analog voltage (5V) for driving the liquid crystal and a lower digital voltage (3.3V) for driving the digital circuit.

FIGS. 1 and 2 are detailed schematic diagrams of conventional circuits for generating the analog voltage (5V) and the digital voltage (3.3V) in the TFT LCD when the supplied power voltage $V_{cc}$ is 5V and 3V, respectively.

As shown in FIG. 1, when a supplied power voltage $V_{CC}$ is 5V, the digital voltage $V_o$ of 3.3V is obtained by a voltage drop using an npn-type bipolar transistor $Q_1$ while the analog voltage $V_a$ of 5V is obtained by a DC/DC converter 10.

As shown in FIG. 2, when the supplied power voltage $V_{CC}$ is 3.3V, the digital voltage $V_o$ of 3.3V is obtained directly while the analog voltage $V_a$ of 5V is generated by the DC/DC converter 10.

There is a problem in the conventional circuits, however, in that the productivity of the TFT LCD module decreases since different voltage generation boards are required depending upon the magnitude of the supplied driving voltage.

SUMMARY OF THE INVENTION

It is, therefore, an object of the invention is to generate both analog and digital voltages regardless of the magnitude of the supplied power voltage by using one board.

To achieve this and other objects, a driving signal generator is provided that receives power voltage having either a first magnitude or a second magnitude less than the first magnitude. The driving signal generator comprises: a DC/DC converter for receiving the power voltage and generating a constant analog voltage of the first magnitude, a divider for dividing the constant analog voltage into a first divided voltage and a second divided voltage, a bipolar transistor having a base supplied with the first divided voltage, a collector supplied with the power voltage, and an emitter connected to a digital voltage output terminal; and a MOS transistor having a gate supplied with the second divided voltage from the DC/DC converter, a drain supplied with the power voltage, and a source connected to the digital voltage output terminal.

In this driving signal generator, the divider preferably comprises two resistors connected in series between the constant analog voltage and a ground voltage. The bipolar transistor is preferably an npn-type bipolar transistor, and the MOS transistor is preferably an NMOS transistor with a zero of turn-on resistance. Preferably the first magnitude is 5V and the second magnitude is 3.3V.

BRIEF DESCRIPTION OF THE DRAWINGS

The foregoing and other objects, features and advantages of the invention will become more readily apparent from the following detailed description of a preferred embodiment of the invention which proceeds with reference to the accompanying drawings.

DETAILED DESCRIPTION OF THE PREFERRED EMBODIMENT OF THE PRESENT INVENTION

Figure 1:
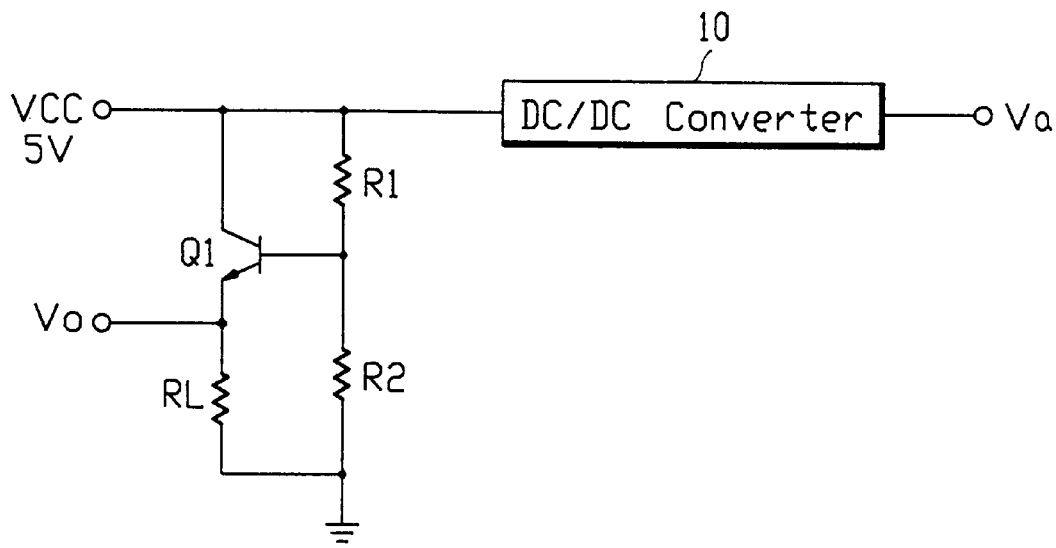
FIG. 1 is a schematic diagram of a conventional driving signal generator of the LCD when the power voltage is 5V.
Figure 2:
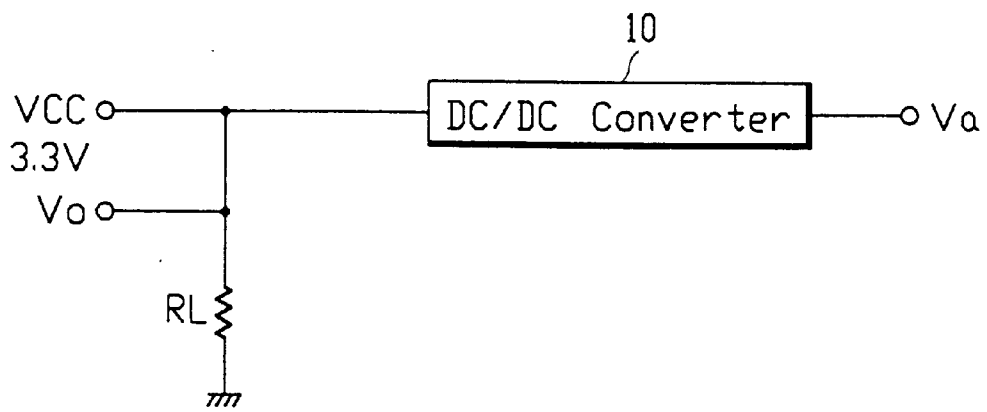
FIG. 2 is a schematic diagram of a conventional driving signal generator of the LCD when the power voltage is 3.3V.
Figure 3:
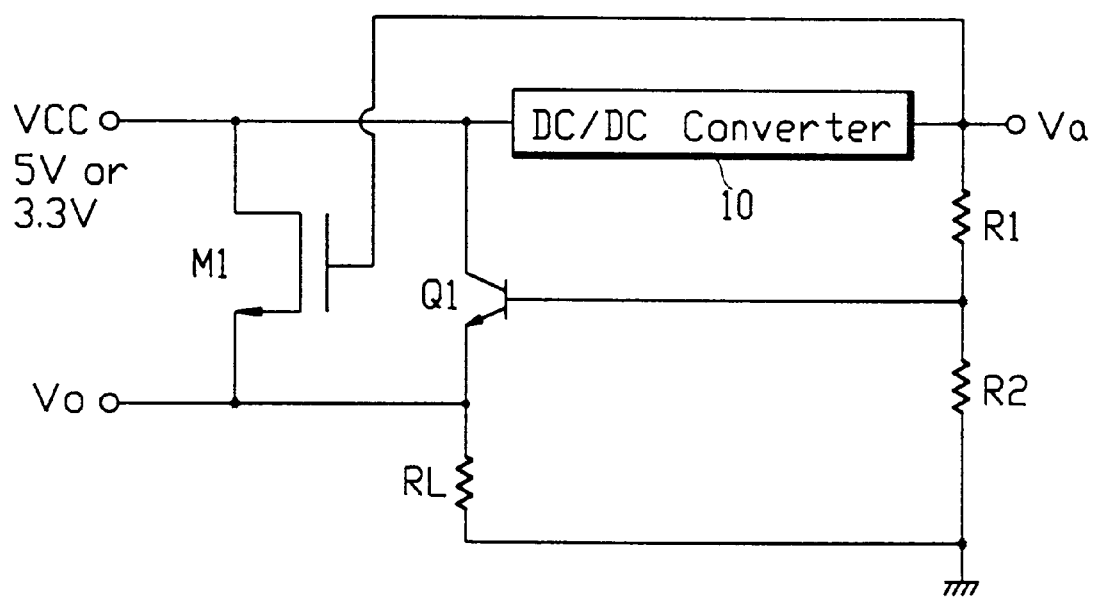
FIG. 3 is a schematic diagram of a driving signal generator of an LCD in accordance with a preferred embodiment of the present invention.

FIG. 3 is a schematic diagram of a driving signal generator of the LCD in accordance with a preferred embodiment of the present invention.

As shown in FIG. 3, the driving signal generator of the LCD includes a DC/DC converter 10, first, second, and load resistors $R_1$, $R_2$, and $R_L$, an npn bipolar transistor $Q_1$, and an NMOS (N metal oxide semiconductor) transistor $M_1$. The NMOS transistor $M_1$ preferably has a zero of turn-on resistance.

An input terminal of the DC/DC converter 10 is connected to a power voltage $V_{CC}$, and an output terminal of the DC/DC converter 10 is connected to an analog voltage output terminal $V_a$. The resistors $R_1$ and $R_2$ are connected in series between the analog voltage output terminal $V_a$ and a ground voltage. The load resistor $R_L$ is connected between the digital voltage output terminal $V_o$ and the ground voltage.

A base of the npn bipolar transistor $Q_1$ is connected to the node between the first and second resistors $R_1$ and $R_2$; a collector of the npn bipolar transistor $Q_1$ is connected to the power voltage $V_{CC}$; and an emitter of the npn bipolar transistor $Q_1$ is connected to the digital voltage output terminal $V_o$.

A gate of the NMOS transistor $M_1$ is connected to the analog voltage output terminal $V_a$; a drain of the NMOS transistor $M_1$ is connected to the power voltage $V_{CC}$; and a source of the NMOS transistor M1 is connected to the digital voltage output terminal $V_o$.

The operation of the driving signal generator shown in FIG. 3 will now be described.

When a power voltage $V_{CC}$ of either 5V or 3.3V is applied to the DC/DC converter 10, the DC/DC converter 10 produces an analog voltage of 5V at the analog voltage output terminal $V_a$.

The voltage across the resistor $R_2$ is applied to the base of the first transistor $Q_1$. Accordingly, the digital voltage $V_o$ applied to the emitter of the transistor $Q_1$ is determined by the following equation.

$$V_o = R_2/(R_1+R_2) \times V_a - V_{be} \quad (1)$$

where $V_{be}$ is the voltage between the base and the emitter of the transistor $Q_1$. The digital voltage $V_o$ is thus determined by a dividing rate of the resistors $R_1$ and $R_2$.

When the power voltage $V_{CC}$ is 5V, the transistors $Q_1$ and $M_1$ are both turned on since the following inequalities are satisfied.

$$V_{CE}=V_{CC}-V_o>0 \qquad (2)$$

$$V_{GS}=V_a-V_o>0 \qquad (3)$$

where $V_{CE}$ is the voltage between the collector and the emitter of the transistor $Q_1$, and $V_{GS}$ is the voltage between the gate and the source of the transistor $M_1$. Accordingly, a current is supplied to the load resistor $R_L$.

When the power voltage $V_{CC}$ is 3.3V, the voltage $V_{CE}$ between the collector and the emitter of the npn bipolar transistor $Q_1$ becomes zero, while the voltage $V_{GS}$ between the gate and source of the NMOS transistor $M_1$ remains greater than zero. Thus, the npn bipolar transistor $Q_1$ is turned off, since inequality (2) is not satisfied, while the transistor $M_1$ still turned on since the inequality (3) is satisfied. Accordingly, the load resistor $R_L$ is supplied with a current and the digital voltage is obtained from the power voltage through the NMOS transistor $M_1$.

As a result of this design, the constant digital voltage $V_o$ can be obtained regardless of the magnitude of the power voltage $V_{CC}$. Furthermore, the digital voltage $V_o$ becomes stable against the change of the power voltage $V_{CC}$ since it $V_o$ is obtained by the constant analog voltage $V_a$, rather than the potentially variable power voltage $V_{CC}$.

An advantage of the driving signal generator of the LCD constructed in accordance with the present invention is that the productivity of the circuit increases since the stable analog and digital voltages are generated with one board.

What is claimed is:

1. A driving signal generator receiving power voltage having either a first magnitude or a second magnitude less than the first magnitude, the driving signal generator comprising:
   a DC/DC converter for receiving the power voltage and generating a constant analog voltage of the first magnitude;
   a divider for dividing the constant analog voltage into a first divided voltage and a second divided voltage;
   a bipolar transistor having a base supplied with the first divided voltage, a collector supplied with the power voltage, and an emitter connected to a digital voltage output terminal; and
   a MOS transistor having a gate supplied with the second divided voltage from the DC/DC converter, a drain supplied with the power voltage, and a source connected to the digital voltage output terminal.

2. A driving signal generator as recited in claim 1, wherein the divider comprises two resistors connected in series between the constant analog voltage and a ground voltage.

3. A driving signal generator as recited in claim 1, wherein the bipolar transistor is an npn-type bipolar transistor.

4. A driving signal generator as recited in claim 1, wherein the MOS transistor is an NMOS transistor.

5. A driving signal generator as recited in claim 4, wherein the NMOS transistor has a zero of turn-on resistance.

6. A driving signal generator as recited in claim 1, wherein the first magnitude is 5V.

7. A driving signal generator as recited in claim 1, wherein the second magnitude is 3.3V.

* * * * *